Patented July 28, 1925.

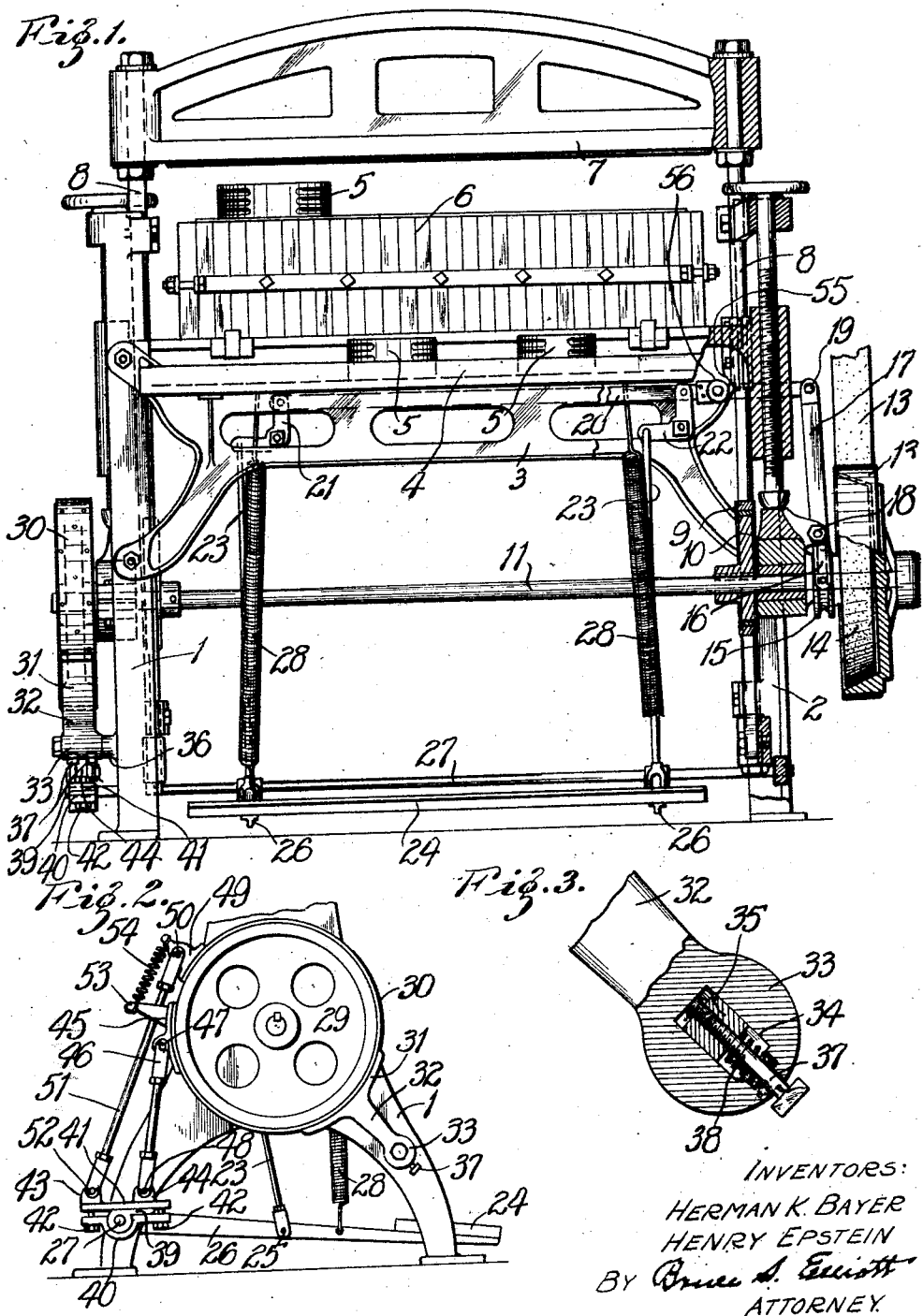

1,547,355

UNITED STATES PATENT OFFICE.

HERMAN K. BAYER AND HENRY EPSTEIN, OF ST. LOUIS, MISSOURI.

BRAKE MECHANISM FOR SOLE-CUTTING MACHINES.

Application filed August 2, 1924. Serial No. 729,689.

*To all whom it may concern:*

Be it known that we, HERMAN K. BAYER and HENRY EPSTEIN, citizens of the United States, residing in the city of St. Louis and State of Missouri, have invented new and useful Improvements in Brake Mechanism for Sole-Cutting Machines, of which the following is a specification.

This invention relates to improvements in machines of the type designed to operate intermittently at the will of an operator, and has special relation to machines for cutting soles for shoes from sheet leather. In such machines, a series of portable dies in employed, one or the other of which, according to the size and character of the soles to be cut, is placed upon a sheet of leather on the bed of the machine, and then a treadle is momentarily depressed to simultaneously release a brake and effect the engagement of a clutch with the driving pulley of the machine, which lowers a head into engagement with the die to cut out the sole from the sheet of leather. Automatic means are provided for securing the positive engagement of the clutch with the driving pulley after the machine has started, and when the treadle is released, the upward movement thereof, effected by springs, causes the release of the clutch and the application of the brake as soon as the automatic means for effecting the engagement of the clutch has passed to inoperative position. In such machines, the movement thereof, due to inertia, is stopped by the application of a brake to a drum, and this is timed by the movement of the automatic device to cause the machine to stop when the head is at its extreme upward position. Thus, the only control that the operator has over the machine is in depressing the treadle to start its operation, and then to release the same to permit the automatic application of the brake as the head reaches its upper position.

In practice, however, it is found that the brake shoe will become smooth, either by wear, or by grease accidentally getting on it or on the brake drum, so that the brake will fail to stop the operation of the machine, and the head will be lowered just as the operator is placing a piece of leather on the die, frequently causing the fingers of the operator to be cut off, or his hand to be maimed or seriously injured.

The brake shoe commonly employed on machines of this type engages only a portion of the brake drum, and therefore does not present sufficient frictional surface to off-set any slight smoothness of the brake shoe or bearing part of the brake, or the slippage due to accidental lodgment of grease or oil on the brake drum.

It is the purpose of our invention, therefore, to provide an improved brake mechanism for machines of this type, which will engage practically the entire surface of the brake drum, so as to insure a positive stop of the machine whenever the brake is applied. It is a further object of the invention to provide means for insuring that the brake shall clear the entire surface of the drum whenever it is released by depressing the treadle, to avoid frictional engagement of the brake with the drum when the machine is operated.

With this object in view, the invention resides in the novel construction of brake and mechanism for effecting the operation of the same hereinafter described, and particularly pointed out in the claims.

The invention is illustrated in the accompanying drawing, in which—

Figure 1 is a view in front elevation of a sole-cutting machine of a well known type, provided with our improved brake mechanism;

Figure 2 is a view of the lower part of the machine looking from the left in Figure 1, showing the brake drum and the brake mechanism connected therewith; and Figure 3 is a broken sectional view showing the means we employ for effecting the complete release of the brake from the brake drum.

We will first give a brief description of the machine, so that the operation of our brake mechanism may be better understood.

Referring now to the drawing, the numerals 1 and 2 indicate side frame members, constituting also standards, on which the machine is supported. Secured to and extending between these standards are cross frame members 3, on which is mounted a table 4, which is used for supporting a plurality of dies 5, to be used with the machine. Mounted above this table is a bed 6, on which one of the dies 5 is placed for cutting out soles. The numeral 7 indicates a head which is connected at either end to rods 8, which, at their lower ends, are provided with rings 9 surrounding eccentrics 10, mounted on a drive shaft 11. On one end of the shaft there is mounted a cone-pulley 12, adapted to be driven by a belt 13 from any suitable source of power, and located within this cone-pulley is a cone-shaped clutch member 14 movable into and out of engagement with the pulley. Connected to the clutch member 14 is a grooved collar 15, the clutch member 14 and collar 15 being splined on the shaft 11, and the pulley 12 being loose thereon, as usual. The collar 15 is engaged in its grooved periphery by a yoke 16, on the lower end of a lever 17, pivotally mounted on the machine at 18, and pivotally connected at its upper end, as indicated at 19, to an operating bar 20. Pivotally mounted on the cross frame members 3, near opposite ends thereof, are two bell cranks 21 and 22, one arm of each of which is pivotally connected to the operating bar 20, and the other to the upper end of a rod 23, the lower end of each of which rods is pivotally connected to a treadle 24 at 25, as indicated in Figure 2.

The treadle 24 has bars 26 extending rearwardly of rock shaft 27, to which the inner ends of these bars are fixedly secured, so that when the treadle is depressed or elevated, the rock shaft 27 will be turned in one direction or the other. This rock shaft is pivotally mounted in bearings in the standards 2. The treadle 24 is elevated after being depressed by means of springs 28 secured at their lower ends near opposite ends of the treadle 24, and at their upper ends to the frame members 3. The brake mechanism with which our invention is concerned will now be described.

Secured on the end of the driving shaft 11, opposite to that containing the pulley 12, is a brake drum 29. Surrounding this brake drum is a brake band 30. This brake band is secured at one side on a casting 31, which has an arm 32 provided at its lower end with a head 33 formed on its interior with a rectangular slot 34 (Figure 3). This slot is mounted for sliding movement on the squared end portion 35 of a stub shaft 36 (Figure 1), secured on one of the legs of the standard 2 (Figure 2). This construction is designed to permit relative movement of the casting 31 toward and from the brake drum 29 in the operation of the brake band, by means hereinafter described.

To this end, we insert through the bottom of the head 33 a set screw 37 (Figure 3), and screw the same through a screw-threaded opening in the squared portion 35 to permit its end to engage the bottom of the slot 34. Between the lower side of the squared portion 35 and the bottom of the slot 34, we interpose a coil spring 38. The screw can be adjusted to vary the degree of movement of the head 33 relative to the squared portion 35, the end of the screw 37 operating as a stop to limit this movement. The manner of operating the brake band will now be described.

The outer end of the rock shaft 27 on the side of the machine containing the brake has fixedly secured thereon a short lever arm 39, and clamped over this lever arm are two clamping members 40 and 41, which are secured in their clamping position by screws 42. These clamping members project a suitable distance beyond the shaft 27 in either direction, and the upper clamping member 40 is provided near its opposite ends with lugs 43 and 44. Secured to one end of the brake band 30 is a casting 45, to which the upper end of a rod 46 is pivotally connected, as indicated at 47, the lower end of said rod being pivotally connected to the lug 44, as indicated at 48. Secured to the other end of the brake band 30 is a casting 49, to which is pivotally connected at 50 the upper end of a rod 51, the lower end of said rod being pivotally connected to the lug 43, as indicated at 52. The casting 45 is also provided at its upper end with an arm 53, and a coil spring 54 is connected at its lower end to the outer end of this arm, and at its upper end, to the outer end of casting 49.

Reference has been made to the automatic operation and release of the clutch member 14. The means for effecting such operation may be described briefly as comprising a cam member 55 (Figure 1) secured on the rod 8 on the side of the machine containing the clutch, the cam surface of which is adapted to engage a roller 56 mounted on the operating bar 20. The operation of the machine as provided with our improved brake mechanism will now be described.

The leather being placed on the bed 6, the die 5 is positioned thereon and the operator places his foot upon treadle 24 and depresses the same. This pulls the rods 23 downward and, through the bell cranks 22 and operating bar 20, throws the clutch member 14 into engagement with the inner walls of pulley 12, which, of course, is constantly revolving, resulting in starting the revolution of shaft 11. As the shaft 11 revolves, the eccentric 10 causes the rods 8 to be drawn downward, and the cam member 55 will then engage the roller 56 and force the clutch member 14 into firm engagement with the pulley through moving the operating bar 20 to the left in Figure 1, and thereby operating the lever 17 to throw the collar 15 and clutch member 14 outward, or into engagement with the pulley. As the rods 8 are pulled downward, the head 7 is lowered into engagement with the die 5 and the sole thereby cut from the leather. As soon as the head engages the die, the operator releases pressure on the treadle 24 and the springs 28 raise said treadle, and thereby, through the medium of the rods 23, moves the bell cranks 22 in the opposite direction to that first described, and through the medium of operating bar 20 and lever 17, releases the clutch member 14 from engagement with the pulley 12.

When the treadle 24 is depressed, such movement of the treadle operates to rock the shaft 27, thereby lowering the lug 44 on the clamping member 41 and pulling the rod 46 downward, and raising the lug 43 and pushing the rod 51 upward, this movement of the rods operating to separate the ends of the brake band 30 and release engagement thereof with the brake drum 29, such separation of the ends of the brake band being effected against the resistance of the coil spring 54. Such release of the brake band from engagement with the drum permits of the free rotation of shaft 11 and, of course, is synchronous with the engagement of the clutch member 14 with pulley 12. When the treadle 24 is released, the springs 28, as stated, draw the same upward, thereby rocking the shaft 27 in the reverse direction to that first described, causing the rod 51 to be pulled downward and the rod 46 to be pushed upward, thereby causing the brake band 30 to engage the surface of the brake practically over its entire periphery. This closing of the brake band about the brake drum and its firm engagement therewith is further facilitated and insured by the action of the coil spring 54, which co-operates with the springs 28 to effect this operation.

One of the features of the invention is the provision of means for causing the brake band to release the entire surface of the brake drum. This is effected by the construction illustrated in Figure 3. Thus, when the ends of the brake bands are separated in the manner described, this produces a downward pressure on the casting 31, the head 33 of which slides over the squared portion 35 until the bottom of the slot 34 engages the inner end of screw 37. This movement of the casting 31 is also insured by the provision of the spring 38, which operates normally to press the casting 31 and brake band 30 away from the brake drum 29. The movement of the head 33 is very slight, say, one-sixteenth of an inch or less, or, in other words, just a distance sufficient to permit the brake band to clear the drum. When the brake band is closed about the drum 29, the casting 31 is drawn upward against the resistance of spring 38.

The construction of brake mechanism described is automatic in action, and, by reason of the firm engagement of the brake band 30 over practically the entire surface of the brake drum, the stoppage of the machine when the head 7 reaches its upward position, is absolutely insured, the frictional resistance afforded being, in fact, far greater than that required to overcome the movement of the brake drum due to the inertia of the moving parts.

We claim:

1. In a machine of the class described, in combination with a main drive shaft, driving means therefor, a reciprocating head operated by said drive shaft, a clutch, a spring-controlled treadle, means operatively connecting the clutch with the treadle and operable, on depression of the treadle, to engage the clutch with said driving means to reciprocate said head, and on release of the treadle and upward movement thereof under spring action, to release the clutch, a brake drum mounted on said shaft, a brake band substantially surrounding said drum, and means actuated on the depression of the treadle to release the brake band from engagement with the drum, and on upward movement of the treadle, to effect re-engagement of the brake band with the drum to prevent further movement of said head.

2. In a machine of the class described, having a drive shaft adapted to be rotated upon depression of a treadle, a reciprocating head actuated by said drive, brake mechanism for stopping the shaft upon release of the treadle to prevent reciprocation of said head, comprising a brake drum on said shaft, a brake band substantially surrounding said drum, means connected with opposite ends of said brake band and movable in opposite directions upon depression of said treadle to open the brake band, and upon release of said treadle and upward movement thereof operated in reversed opposite directions, to close said brake band, and means for causing said treadle to be raised upon release thereof.

3. In a machine of the class described, in combination with a drive shaft, a rock shaft, a spring-controlled treadle secured at its inner end to said rock shaft, means operating on depression of the treadle to cause said shaft to rotate, a brake drum on said shaft, a brake band substantially surrounding said drum, a rocking member mounted on the end of said rock shaft, rods pivotally connected to said rocking member at opposite sides of said rock shaft and to the respective ends of said brake band, whereby, upon depression of the treadle, said rocking member will be moved to lower one rod and raise the other to separate the ends of the brake band, and upon upward movement of said treadle under spring action, said rocking member will be actuated to reverse the movement of said rods and thereby close said brake band into engagement with the brake drum, and means operating upon upward movement of the treadle to release the shaft from driving engagement.

4. In a machine of the class described, in combination with a spring-controlled treadle, a driving shaft, means operating upon depression of said treadle to rotate said shaft, and upon upward movement of the treadle, to release the shaft from driving engagement, a brake drum on said shaft, a brake band substantially surrounding said brake drum, means actuated by the depression of said treadle to separate the ends of said brake band and release its engagement with the brake drum, and upon upward movement of said treadle, to close the brake band about the brake drum, and a spring connecting the ends of said brake band and tending normally to draw the ends of the brake band toward each other.

5. In a machine of the class described, in combination with a spring-controlled treadle, a drive shaft, means actuated on depressing the treadle to cause said shaft to be rotated, and on upward movement of the treadle, to release driving engagement with the shaft, a brake drum on said shaft, a brake band substantially surrounding said drum, means actuated by depressing the treadle to separate the ends of said brake band, and on upward movement of the treadle, to draw the ends of the brake band together, and means operating automatically to draw the brake band away from the brake drum when the ends of the brake band are separated.

6. In a machine of the class described, in combination with a spring-controlled treadle, a drive shaft, means actuated on depressing the treadle to cause said shaft to be rotated, and on upward movement of the treadle, to release driving engagement with the shaft, a brake drum on said shaft, a brake band substantially surrounding said drum and bodily movable laterally relative thereto when the ends of the band are separated, and means actuated by depressing the treadle to separate the ends of said brake band, and on upward movement of the treadle, to draw the ends of the brake band together.

7. In a machine of the class described, in combination with a spring-controlled treadle, a drive shaft, means actuated on depressing the treadle to cause said shaft to be rotated, and on upward movement of the treadle, to release driving engagement with the shaft, a brake drum on said shaft, a brake band substantially surrounding said drum, means actuated by depressing the treadle to separate the ends of said brake band, and on upward movement of the treadle, to draw the ends of the brake band together, a casting supporting said brake band and slidably mounted on a fixed part of the machine, and a spring interposed between said casting and said fixed part of the machine and operating to draw the casting and brake band away from the brake drum when the ends of the brake band are separated.

8. In a machine of the class described, in combination with a spring-controlled treadle, a drive shaft, means actuated on depressing the treadle to cause said shaft to be rotated, and on upward movement of the treadle, to release driving engagement with the shaft, a brake drum on said shaft, a brake band substantially surrounding said drum, means actuated by depressing the treadle to separate the ends of said brake band, and on upward movement of the treadle, to draw the ends of the brake band together, a casting supporting said brake band and slidably mounted on a fixed part of the machine, a spring interposed between said casting and said fixed part of the machine and operating to draw the casting and brake band away from the brake drum when the ends of the brake band are separated, and an adjustable stop for limiting the movement of said casting.

9. In a machine of the class described, in combination with a spring-controlled treadle, a drive shaft, means actuated on depressing the treadle to cause said shaft to be rotated, and on upward movement of the treadle, to release driving engagement with the shaft, a brake drum on said shaft, a brake band substantially surrounding said drum, means actuated by depressing the treadle to separate the ends of said brake band, and on upward movement of the treadle, to draw the ends of the brake band together, a casting supporting said brake band and slidably mounted on a fixed part of the machine, a spring interposed between said casting and said fixed part of the machine and operating to draw the casting and brake band away from the brake drum when the ends of the brake band are separated, an adjustable stop for limiting the movement of said casting, and an adjustable screw mounted in said fixed part of the machine and engaging said casting to limit the movement thereof.

10. In a machine of the class described, in combination with a spring-controlled treadle, a drive shaft, means actuated on depressing the treadle to cause said shaft to be rotated, and on upward movement of the treadle, to release driving engagement with the shaft, a brake drum on said shaft, a brake band substantially surrounding said drum, means actuated by depressing the treadle to separate the ends of said brake band, and on upward movement of the treadle, to draw the ends of the brake band together, a casting supporting said brake band and having an arm provided with a slot, a fixed part of the machine engaging in said slot, a set-screw passed through said fixed part of the machine and having its end adapted to engage the bottom of said slot at one end, and a coil spring interposed between the fixed part of the machine and the bottom of said slot at the other end.

In testimony whereof, we have hereunto set our hands.

HERMAN K. BAYER.
HENRY EPSTEIN.